Sept. 22, 1931.  G. REICHENBECHER  1,824,499

REENFORCED PIPE JOINT

Filed Dec. 21, 1928

Inventor:
Georg Reichenbecher
by  
Attorney

Patented Sept. 22, 1931

1,824,499

UNITED STATES PATENT OFFICE

GEORG REICHENBECHER, OF MULHEIM-RUHR, GERMANY, ASSIGNOR TO THE FIRM VEREINIGTE STAHLWERKE AKTIENGESELLSCHAFT, OF DUSSELDORF, GERMANY

REENFORCED PIPE JOINT

Application filed December 21, 1928, Serial No. 327,617, and in Germany March 27, 1928.

The present invention relates to reenforced pipe joints and has for its object to provide a particularly advantageous pipe joint in which the end of the pipe has been reenforced to about three times its original wall thickness by folding it back upon itself several times to form multiple circumferential layers.

According to the present invention the ends of pipes that have been reenforced by folding them back several times, are not only employed for the purpose of manufacturing pipe joints of the spigot and socket type, in which the connection of the parts is being brought about, for instance, by means of a lead packing or by welding, but also for the purpose of manufacturing flanged socket joints having an integral flange.

Accordingly, the present invention consists in that the ends of pipes that have been reenforced by folding them back several times are being flanged out so as to form a ring flange that either directly or in connection with a loose flange is capable of receiving the flange securing means. It will be readily understood that without departing from the spirit of the present invention the reenforcing layers may be folded either on the inner or on the outer wall of the pipe. Such reenforced flange joints are capable of offering particularly great resistance and may be employed to best advantage in all cases where a particularly great durability and strength are a prime desideratum. From the foregoing it will be clear that the principle of the invention may be employed in the manufacture of a variety of shapes of flanged sockets.

Another feature of the present invention consists in that the back portion r of a layer may be welded in any suitable manner to either the inner or the outer wall of the pipe, which means a further considerable strengthening of the joint.

In order that the invention may be better understood various modes of carrying the invention into effect are shown in the annexed drawings, by way of example.

Figure 1:
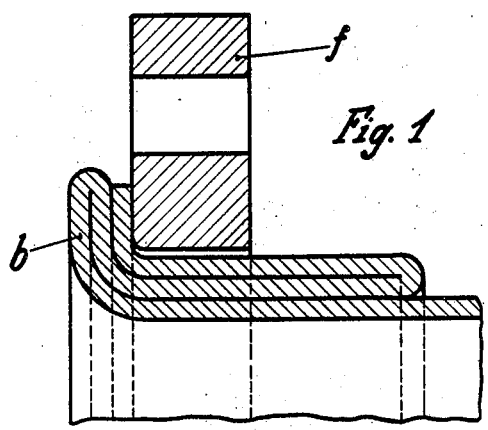
Fig. 1 shows a ring flange joint the reinforcing layers of which have been folded back on the outer wall of the pipe. The integral ring flange, thus formed, provides the necessary bearing surface for a loose flange.
Figure 2:
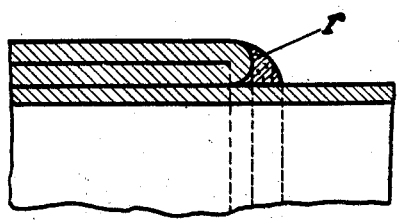
Fig. 2 shows the back portion of the layer illustrated in Fig. 1 welded to the wall of the pipe.
Figure 3:
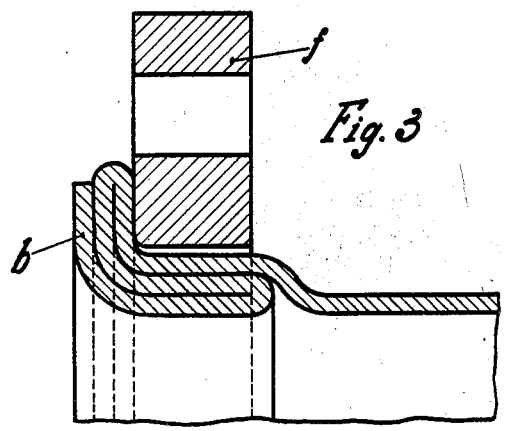
Fig. 3 shows the same joint as illustrated in Fig. 1 except that the reinforcement has been brought about by folding the end of the pipe back on the inner wall of the pipe.
Figure 4:
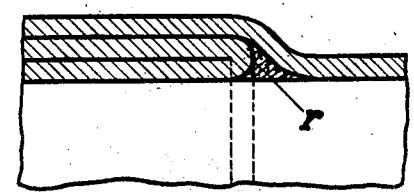
Fig. 4 shows the reinforcement as illustrated in Fig. 3 welded to the inner wall of the pipe.
Figure 5:
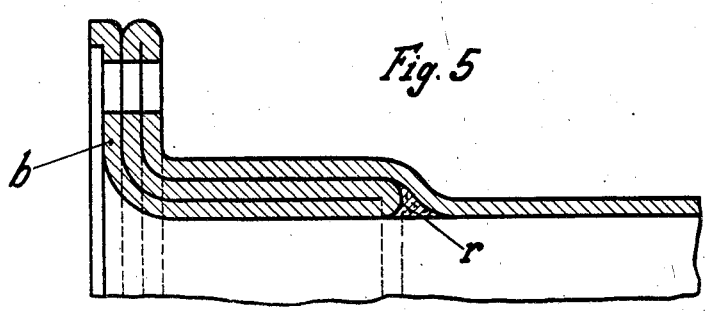
Fig. 5 shows a flange joint in which the end of the pipe has been reenforced by folding it back on the inner wall of the pipe. The integral flange thus formed is capable of receiving the flange bolts.

In the drawings $b$ designates the ring flange reenforced by the folding operation, $r$ the back portion of the tilted part of the pipe which is welded to the inner or outer wall of the pipe respectively, and $f$ the loose flange.

Having thus described the invention what I claim as new and desire to secure by Letters Patent is:

1. A reenforced flanged pipe end having its wall folded back and forth upon itself several times to form circumferential layers and its flange formed integrally by bending said circumferential layers together in such a fashion that the juncture between said flange and the cylindrical pipe wall has a thickness equal to the sum of the thickness of said layers.

2. A reenforced pipe joint having the end of the pipe wall folded back and forth upon itself several times to form circumferential layers, an integral flange formed by bending said circumferential layers together in such a fashion that the juncture between said flange and the cylindrical pipe wall has a thickness equal to the sum of the thickness of said layers and flange securing means engaging said integral flange.

3. A reenforced pipe joint having the end of the pipe wall outwardly folded back and forth upon itself twice to form three circumferential layers, an integral flange formed by bending said three circumferential layers together in such a fashion that the juncture between said flange and the cylindrical pipe wall has a triple thickness, a weld on the periphery of the cylindrical pipe wall joining and fitting together said wall and the second elbow, or bent end opposite to said flange, adjacent to said wall and flange securing means engaging said integral flange.

4. A reenforced pipe joint having the end of the pipe wall inwardly folded back and forth upon itself twice to form three circumferential layers, and integral flange formed by bending said three circumferential layers together in such a fashion that the juncture between said flange and the cylindrical pipe wall has a triple thickness, a weld on the interior surface of the cylindrical pipe wall joining and fitting together said wall and the second elbow, or bent end opposite to said flange, adjacent to said wall and flange securing means engaging said integral flange.

In testimony whereof I affix my signature.

GEORG REICHENBECHER.